(No Model.) 3 Sheets—Sheet 1.
J. P. VAN SICKLE.
SPRINKLING DEVICE.
No. 553,727. Patented Jan. 28, 1896.
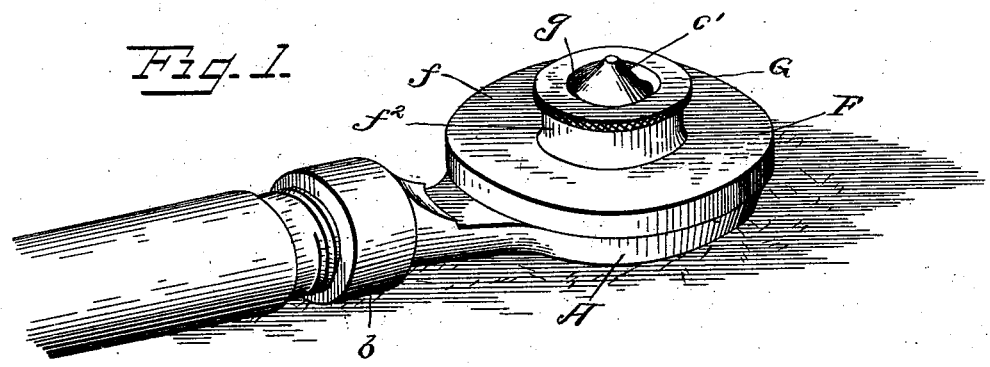
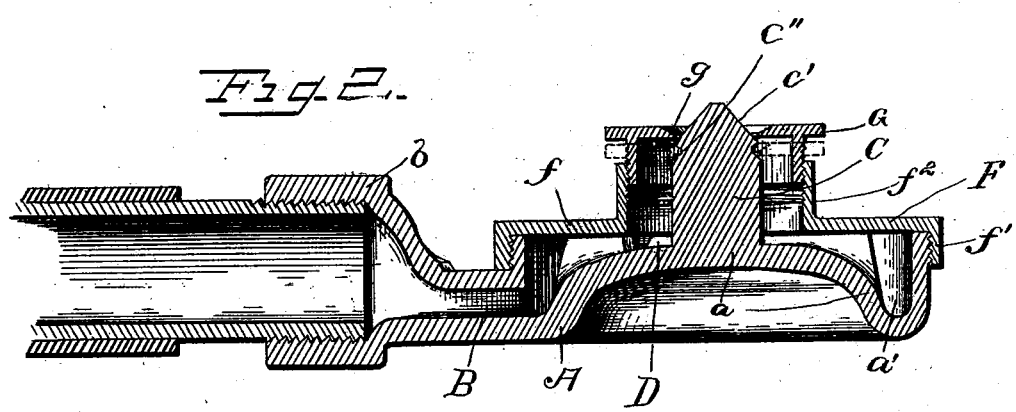
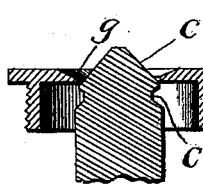
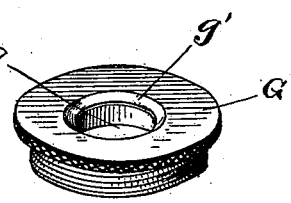
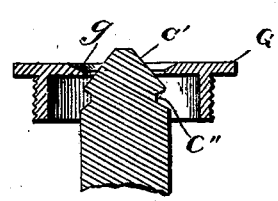
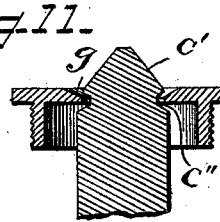
Witnesses
Howard D. Orr.
H. F. Shepard.
John P. Van Sickle
Inventor
by
J. R. Littell
his Attorney (No Model.) 3 Sheets—Sheet 2.
J. P. VAN SICKLE.
SPRINKLING DEVICE.

No. 553,727. Patented Jan. 28, 1896.

Witnesses
Howard D. Orr.
H. D. Shepard

John P. Van Sickle
Inventor
by J. R. Littell,
his Attorney (No Model.)  3 Sheets—Sheet 3.
J. P. VAN SICKLE.
SPRINKLING DEVICE.
No. 553,727. Patented Jan. 28, 1896.
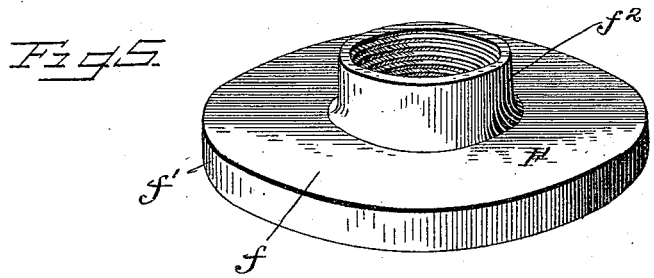
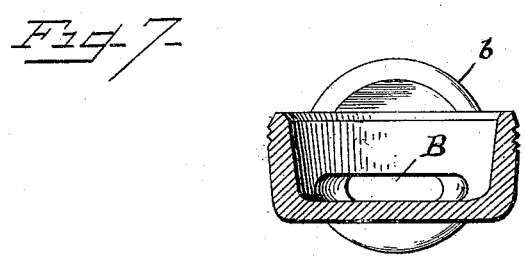
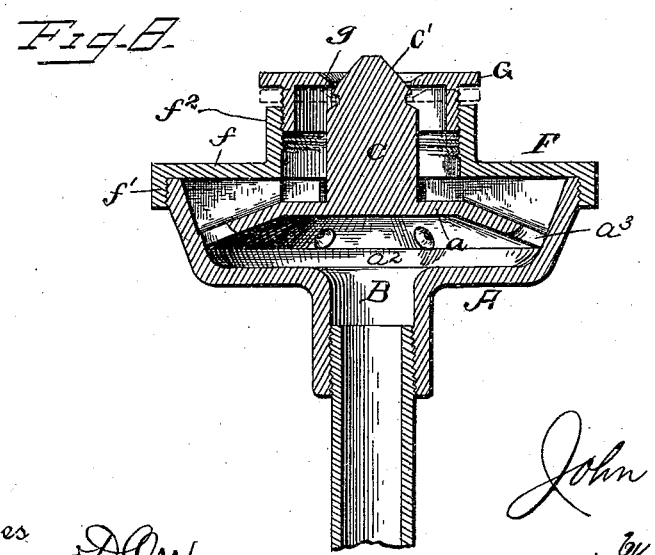
Witnesses
Howard D. Orr.
H. S. Shepard
John P. Van Sickle
Inventor
by J. R. Littell,
his Attorney

UNITED STATES PATENT OFFICE.

JOHN PULASKI VAN SICKLE, OF LOS ANGELES, CALIFORNIA, ASSIGNOR OF ONE-HALF TO WILLIAM H. KELSO, OF SAME PLACE.

SPRINKLING DEVICE.

SPECIFICATION forming part of Letters Patent No. 553,727, dated January 28, 1896.

Application filed October 2, 1893. Serial No. 487,129. (No model.)

*To all whom it may concern:*

Be it known that I, JOHN PULASKI VAN SICKLE, a citizen of the United States, residing at Los Angeles, in the county of Los Angeles and State of California, have invented a new and useful Sprinkling, Spraying, and Irrigating Device, of which the following is a specification.

My invention relates to improvements in sprinkling, spraying, and irrigating devices, and is adapted for attachment to a garden-hose or stationary stand-pipe.

The device is designed to effectively spray the water in a fine sheet, and at the same time distribute it centrifugally, thereby covering a great area of space to be watered.

The object of my invention is to provide an exceedingly cheap and simple device (consisting of only three parts) and one that can be regulated to spray the water in various ways.

A further object is to so construct the device that the friction of the water is reduced to a minimum.

With these objects in view, my invention consists in the peculiar construction of the various elements and their novel combination or arrangement, all of which will be hereinafter fully described and particularly pointed out in the claims.

Figure 3:
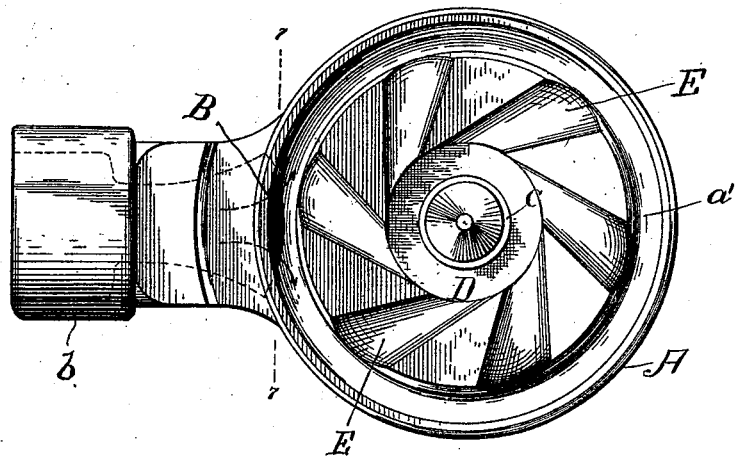
Figure 4:
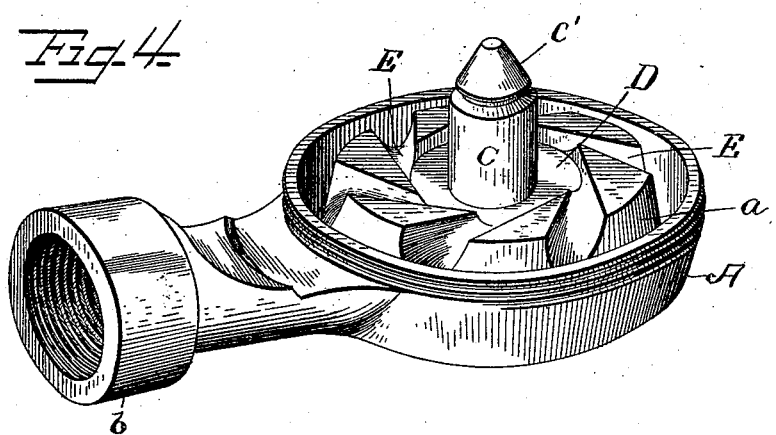

In the drawings forming a part of this specification, Figure 1 is a perspective view of my device complete and ready for use. Fig. 2 is a longitudinal sectional view of the same. Fig. 3 is a top plan view of the base portion with the cover and cap-pieces removed. Fig. 4 is a perspective view of the same. Fig. 5 is a perspective view of the cover. Fig. 6 is a similar view of the cap-piece. Fig. 7 is a sectional view on the line 7 7, Fig. 3. Fig. 8 is a sectional view of a slightly-modified form. Figs. 9, 10, and 11 are detail sections illustrating the adjustment of the cap-piece.

Corresponding parts in all the figures are denoted by the same letters of reference.

In constructing my improved device I employ a metallic base-piece or body A, preferably circular in shape and formed with a central raised portion $a$, providing an annular reservoir $a'$ between said central portion and the sides of the base, and leading into this reservoir is a flat semicircular pipe or tube B, provided at its outer end with a threaded coupling $b$, by means of which the device is connected with an ordinary garden-hose or other water-supply pipe.

The pipe B is preferably formed integral with the base A and the opening of the same is level with the bottom of the reservoir. It will be noted that the inlet of the flat feed-pipe B is approximately fan-shaped or gradually widened, by which construction friction in dividing and distributing the flow of water is reduced to a minimum and the distribution of the water each way into the reservoir is more readily effected. A central stud or post C projects vertically from the central portion $a$ and is formed with a conical top $c'$, the purpose of which will be hereinafter fully described. At the base of said conical top is formed an annular groove or channel $c''$, by means of which the spray may be regulated. At the base of this stud or post C is provided a circular chamber or channel D, and leading into said chamber are a series of tangential grooves or conduits E, which extend from the annular reservoir $a'$ to the channel D, said grooves or conduits E being made broader and deeper at their outer ends in order to concentrate the water into the circular chamber D.

The outer edges of the base A are threaded, and upon said base is screwed a cover F, which comprises the flat top portion $f$, having a depending threaded flange $f'$ and the central raised portion $f^2$, the cover being of such relative construction that when properly screwed upon the base the top will rest upon the central raised portion, thus forming a top for the annular reservoir $a'$ and conduits or grooves E. The central raised portion $f^2$, in connection with the circular channel D, constitutes an annular distributing-chamber, of which the central stud or post C forms the inner wall. The raised portion $f^2$ is threaded to receive a cap-piece G, said cap-piece having a central aperture $g$, preferably provided with beveled upper edges $g'$. The conical top $c'$ passes through the aperture $g$, and this aperture being somewhat larger than the cone proper, C, but of substantially the same size as the base of the cone, the water will escape in a circular sheet or spray, and the angle of inclination of this sheet can be regulated by raising or lowering the cap-piece, so that the edges of the aperture co-act with the cone $c'$ or with the annular groove in the stud or post and thus serve to spread or contract the sheet.

In Fig. 8 I have shown a somewhat modified form of construction, which is adapted for attachment to a vertical stationary stand-pipe or the pipe of a portable hose-carriage. The general construction of this device is substantially similar to that shown in the other figures, the only difference being that the supply-pipe is arranged to enter at the bottom and instead of the annular arrangement of the reservoir $a'$ I employ a central reservoir $a^2$, located in the base of the body-piece A and co-extensive with it, so as to make direct connection with the base and outer extremity of each tangential conduit, as at $a^3$.

In operation the supply pipe or hose is connected with the coupling $b$ and the screw-cap adjusted to deliver a broad or narrow spray. To deliver a broad spray, it is screwed down to operate in conjunction with the annular groove $c''$, so that the water impinging upon the sides and top of said grooves will be deflected outward. To deliver a narrow spray the cap-piece is simply elevated to operate in conjunction with the cone $c'$. The water enters through the inlet-pipe, and passes into the reservoir, from whence it enters the tangential grooves or conduits, which deliver it into the inner circular channel or chamber with a whirling motion. From here it escapes through the cap between the edges of the aperture and the stud or post.

It will be observed that my improved sprinkling, spraying, and irrigating device is particularly adapted for lawn, garden, field, orchard, or similar uses and that it consists of but three parts or pieces. The main part forms the body, base or ground piece and embodies integrally the feed-pipe, preferably having the fan-shaped inlet directly entering an annular channel or reservoir corresponding to the circumference of the body. This base-piece also forms the bottom and inside wall of the inner upper channel or chamber D, and in the upper face of the portion of the base-piece lying between the reservoir and the bottom part of the inner chamber D are located the system of tangential conduits. The upper face in which the tangential conduits are formed has a horizontal surface corresponding to the top and outer rim of the reservoir. The tangential conduits are regularly arranged in a circular series, all tending toward a common center, and are approximately semifunnel shaped, with flaring mouths at the inner side of the reservoir and inclined upwardly to contracted throats entering the bottom of the inner upper chamber D. The system of conduits is thus constructed and arranged for the purpose of giving proper direction to the flow of water in passing from the reservoir to the inner chamber, and the conduits are regularly or equidistantly arranged for the purpose of relieving the reservoir and at the same time feeding the inner chamber with corresponding uniformity. The semifunnel shape of the conduits serves to relieve the friction of the flow of water and at the same time concentrates the water-pressure force on the inner chamber and near the point of exit or discharge. The base-piece also embodies the stud or post C, and the portion of this stud from its base to the deflecting recess or groove below its conical top forms the inside wall of the inner chamber D.

The second piece or portion of my improved device consists of a cover, which when adjusted closely covers the horizontal upper face of the central portion of the body-piece and forms the top of the reservoir and tangential conduits. The central raised portion $f^2$ of the cover-piece forms the outer wall of the inner chamber D.

The third portion comprises the top piece, which is adjusted to the cover-piece and forms the top of the inner chamber D, while the aperture in the top piece regulates the spray by adjustment with relation to the conical top or groove in the stud or post. The top piece is thus adjustable vertically and its central opening corresponds in size with the base of the cone and is adapted to accommodate the projecting cone in whole or in part, thereby making the deflecting-groove at the base of the cone available or not, as desired.

The inner circular chamber D receiving the tangential jets of water at its base unites them into a swirl, which is ejected through the annular opening formed by the relative positions of the top piece and cone. When the top piece is adjusted with its opening above the deflecting-groove at the base of the cone, so that said groove is not in use, the cone carries the swirl well up toward its apex, from whence it is scattered by its centrifugal force.

It is manifest that by various adjustments of the top piece with relation to the cone or to the deflecting groove or channel $c''$ a great variety of results are attainable. The deflecting-groove is designed for use only under certain circumstances and conditions, the cone being principally depended upon when the device is used as a sprinkler. When the edges in the opening in the top piece are adjusted to a plane slightly above the plane of the edge of the base of the cone, as shown in Fig. 9, the swirl is pressed out through the narrow annular opening thus provided and closely hugs the face of the cone, forming a small twist at its apex. The friction of this twist turns a small portion of the water into a fine mist or spray, which falls near the sprinkler, while the balance is "sheeted" outward and upward a few inches in the shape of a funnel and then separates into a spray or sprinkle which will cover considerable surrounding area. The extent of adjustment of the aperture $g$ above the plane of the base of the cone depends upon the pounds of pressure to the square inch. For a low pressure only a slight elevation is necessary, the elevation being increased (see Fig. 10) with relation to the increased pressure of the water or the quantity of the water to be thrown. The elevation of the top piece reduces the radius of the sprinkle and carries a coarser and heavier spray, while the adjustment of the top piece downwardly causes reverse conditions, as desired. The adjustment of the opening $g$ with relation to the deflecting groove or channel $c'$ at the base of the cone, as shown in Fig. 11, causes a deflection of the swirl and a variation in the spray or sprinkle.

I do not wish to be understood as limiting myself to the precise construction, arrangement, and operation of parts as herein shown and described, as it is manifest that numerous variations or modifications in the detail structure and arrangement may be employed, and the device may be adapted for use in various positions and connections, without departing from the spirit and scope of my invention. I therefore reserve the right to all such variations and modifications as properly fall within the scope of my improvements and the terms of the following claims.

Having thus described my invention, what I claim is—

1. A sprinkling, spraying or irrigating device, embodying a flat body or base portion having a reservoir and a central chamber from the bottom of which extends a horizontally-arranged series of tangential grooves or conduits forming a passage between the reservoir and the central chamber, and a fixed stud or post projecting within the central chamber and provided with a conical top; in combination with a cover mounted upon the flat body and having a central raised portion forming the side walls of the central chamber; and a cap vertically adjustable upon the central raised portion of the cover and having an opening, substantially as set forth.

2. In a sprinkling, spraying or irrigating device, the combination, with a base having a central raised portion formed with a central stud or post, a circular chamber or channel, and tangential grooves or conduits; of a cover secured upon said base and formed with a central raised portion, and an adjustable cap-piece having a central aperture, substantially as shown and described.

3. A sprinkling, spraying, or irrigating device, comprising a base-piece or body having a reservoir and an inner chamber, tangential grooves or conduits leading from the reservoir to the inner chamber, a post or stud projecting upwardly from said inner chamber and provided with a conical top and a circumferential groove or channel at the base of the cone, and an inlet-pipe entering the reservoir; a cover adjusted at the top of the body and having a central raised portion forming a continuation of the inner chamber; and a top piece adjustable upon the cover and having a central aperture adapted to operate with relation to the cone or the groove at the base thereof; substantially as and for the purpose set forth.

4. In a sprinkling, spraying, or irrigating device, comprising a base or body having an annular reservoir and a central raised portion in which are formed conduits leading from the reservoir, a projecting cone thereon, a cover for the base or body, a top piece adjustable on the cover and centrally apertured to operate in conjunction with the cone, and an inlet-pipe provided with an approximately fan-shaped or gradually-widened inlet opening into the annular reservoir, substantially as and for the purpose set forth.

5. The herein-described improved sprinkling, spraying or irrigating device, consisting of a flat body or base portion having a reservoir and a central chamber and a horizontally-arranged series of tangential grooves or conduits connecting the reservoir with the central chamber and formed in a raised portion which surrounds said chamber and has a flat top; a post or stud projecting within said chamber and having a conical top; a flat cover secured over the base or body and forming the top of the tangential grooves or conduits, the cover resting against the top of said raised portion of the base-piece and having a central raised portion forming the side walls of an extension of the central chamber; and a cap-piece vertically adjustable upon the central raised portion of the cover and forming the top of said central chamber, the cap-piece being provided with an opening operating in relation to said conical top, substantially as and for the purpose set forth.

6. A sprinkling, spraying, or irrigating device, comprising a body or base portion having a reservoir and a central chamber from the bottom of which extends a horizontally-arranged series of tangential grooves or conduits forming a passage between the reservoir and the central chamber, a fixed stud or post carried by the base or body portion and projecting upwardly from the base or body portion within the central chamber and provided with a conical top, and a cap or cover independently mounted with relation to the fixed stud or post rising from the base or body portion and vertically adjustable in relation to said independent post, the adjustable cap being mounted over the central chamber and having an opening adapted to receive the conical top of the post projecting within said central chamber from the body or base portion, substantially as set forth.

In testimony whereof I affix my signature in presence of two witnesses.

JOHN PULASKI VAN SICKLE.

Witnesses:
RALPH WALDO KEAGES,
BENJAMIN WINWOOD DIEHL.